US010044408B2

(12) United States Patent
Yang et al.

(10) Patent No.: US 10,044,408 B2
(45) Date of Patent: Aug. 7, 2018

(54) METHOD FOR AUTOMATICALLY REMOVING CROSSTALK AND AN APPARATUS THEREOF

(71) Applicant: Arcadyan Technology Corp., Hsinchu (TW)

(72) Inventors: Yu-Shuang Yang, Hsinchu (TW); Shih-Chao Chu, Hsinchu (TW); Sheng-Jhe Hong, Hsinchu (TW); Po-Chieh Tseng, Hsinchu (TW)

(73) Assignee: Arcadyan Technology Corp., Hsinchu (TW)

( * ) Notice: Subject to any disclaimer, the term of this patent is extended or adjusted under 35 U.S.C. 154(b) by 0 days.

(21) Appl. No.: 15/624,936

(22) Filed: Jun. 16, 2017

(65) Prior Publication Data

US 2017/0366227 A1    Dec. 21, 2017

(30) Foreign Application Priority Data

Jun. 16, 2016    (TW) .............................. 105119011 A

(51) Int. Cl.
| | | |
|---|---|---|
| H04B 15/00 | (2006.01) | |
| H04N 11/02 | (2006.01) | |
| H03D 1/00 | (2006.01) | |
| H04J 1/12 | (2006.01) | |
| H04B 3/32 | (2006.01) | |

(Continued)

(52) U.S. Cl.
CPC ............... *H04B 3/32* (2013.01); *H04B 3/487* (2015.01); *H04L 12/2878* (2013.01); *H04L 25/03828* (2013.01); *H04M 3/007* (2013.01); *H04M 3/34* (2013.01); *H04M 11/062* (2013.01)

(58) Field of Classification Search
CPC ......... H04M 11/062; H04M 3/30; H04B 3/32; H04B 3/487; H04L 12/2878; H04L 25/03828; H04L 25/085; H04L 27/2601
USPC .... 379/1.01, 1.03, 1.04, 9, 22, 22.02, 22.04, 379/22.08, 26.01, 27.01, 29.01, 29.02; 375/211, 213, 216, 219, 220, 221, 222, 375/240, 240.26, 240.27, 240.29, 242, 375/271, 278, 285, 284, 295, 316, 317, 375/340, 342, 346, 344, 347, 348; 370/201

See application file for complete search history.

(56) References Cited

U.S. PATENT DOCUMENTS 6,978,015 B1 * 12/2005 Erickson ................. H04M 3/18
                                                                375/254
9,774,367 B2 *  9/2017 Yang ......................... H04B 3/32
(Continued)

FOREIGN PATENT DOCUMENTS

WO    WO-20100185662    *  2/2010   .............. H04B 3/32

*Primary Examiner* — Binh Kien Tieu
(74) *Attorney, Agent, or Firm* — Haynes and Boone, LLP

(57) ABSTRACT

The present invention discloses a method and an apparatus to automatically remove crosstalk, which can automatically mask G.fast frequencies that will produce crosstalk between an existing transmission line and each port of a DPU/DSLAM equipment without unnecessary manual operation, to automatically remove crosstalk interference between G.fast and the existing transmission line, and is applicable for various generic interfaces. According to the present invention, the installation time is greatly reduced, human errors are also reduced, and the installation can be done correctly by ordinary technicians, which is advantageous to the promotion of G.fast systems.

20 Claims, 4 Drawing Sheets

(51) Int. Cl.
*H04M 3/00* (2006.01)
*H04M 3/34* (2006.01)
*H04L 12/28* (2006.01)
*H04L 25/03* (2006.01)
*H04M 11/06* (2006.01)
*H04B 3/487* (2015.01)

(56) References Cited

U.S. PATENT DOCUMENTS

| | | | |
|---|---|---|---|
| 2010/0027601 A1* | 2/2010 | Fang | H04B 3/32 375/222 |
| 2012/0275576 A1* | 11/2012 | Wei | H04B 3/32 379/32.04 |
| 2015/0288811 A1* | 10/2015 | Kerpez | H04B 3/32 379/28 |
| 2016/0043786 A1* | 2/2016 | Maes | H04B 3/32 375/260 |
| 2016/0295014 A1* | 10/2016 | Wei | H04M 3/34 |

* cited by examiner

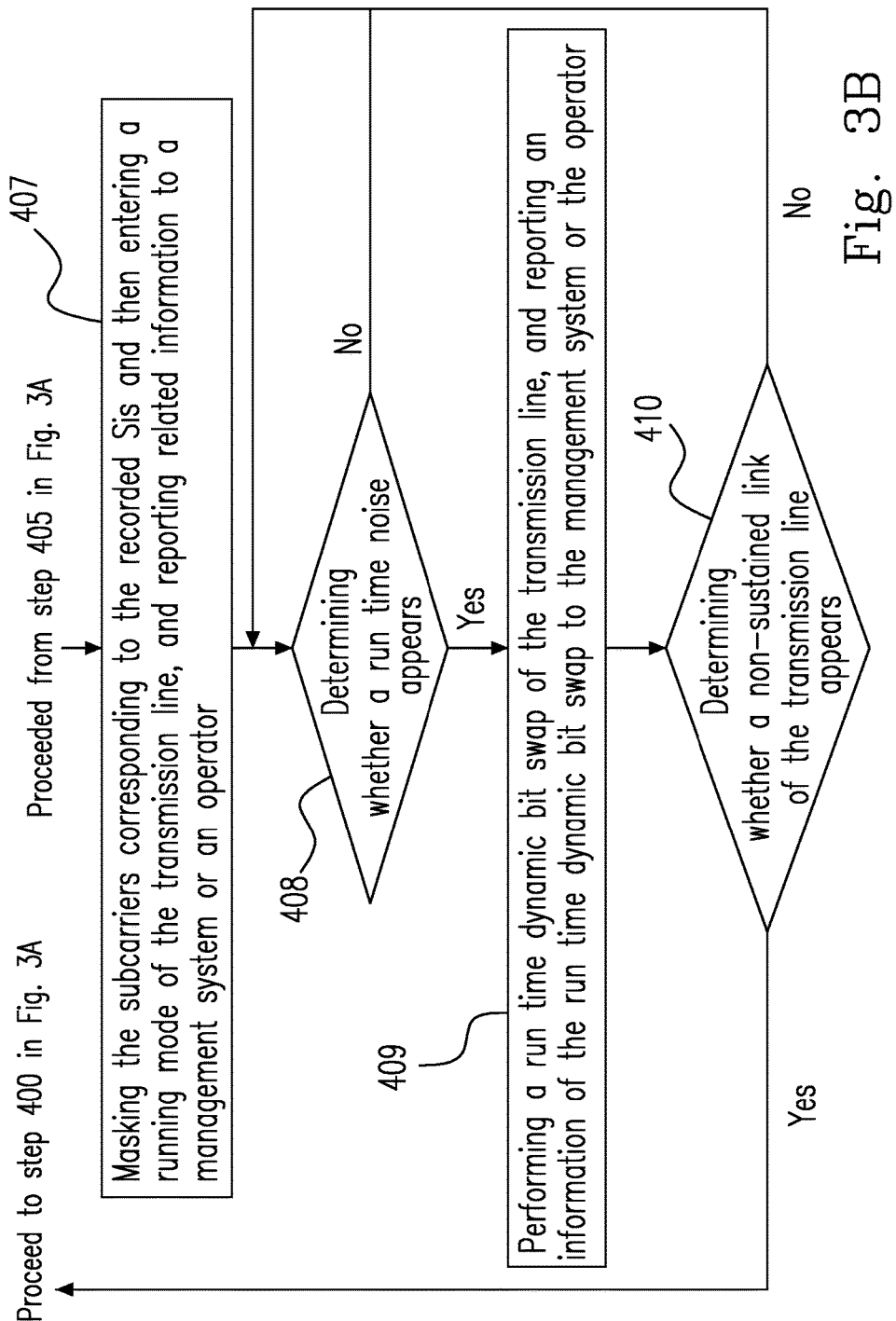

METHOD FOR AUTOMATICALLY REMOVING CROSSTALK AND AN APPARATUS THEREOF

CROSS-REFERENCE TO RELATED APPLICATION AND CLAIM OF PRIORITY

The application claims the benefit of Taiwan Patent Application No. 105119011, filed on Jun. 16, 2016, at the Taiwan Intellectual Property Office, the disclosures of which are incorporated herein in their entirety by reference.

FIELD OF THE INVENTION

The invention is related to a method and an apparatus for automatically removing crosstalk, and more particularly to a method and an apparatus for automatically removing crosstalk between a fast access to subscriber terminals (G.fast) system and another transmission line on a generic interface.

BACKGROUND OF THE INVENTION

G.fast is an ITU (International Telecommunication Union) DSL (digital subscriber line) standard, and provides ultra-high-speed broadband network transmission. The service distance of G.fast is within 300 m, which provides a solution to the last mile problem for broadband networks. Therefore, in places where optical fiber deployment is difficult, G.fast can achieve ultra high bandwidth and speed. For example, the network transmission speed of the copper telephone wire in an old traditional building can be increased up to 1 Gbps. The G.fast system does not require rewiring the entire building or house. Thus, the most expensive and time-consuming process for connecting the optical fiber to residences can be eliminated. At the same time, the coaxial cable is already installed widely in the field as an existing cable TV (CATV) and broadband service. The existing equipment for telecommunications companies may be a copper telephone wire providing plain old telephone service (POTS) to homes and a coaxial cable providing CATV service. Since the coaxial cable is owned by the community management committee, there won't be a property problem when the telecommunications company uses it. Furthermore, because of the digitization of cable TV, the telecommunications company can also use the coaxial cable to provide G.fast service.

ITU Recommendation (ITU-T G9701) requires reverse power for G.fast distribution point unit (DPU)/digital subscriber line access multiplexer (DSLAM) equipment connected to a dwelling. The telecommunications company may keep the copper telephone wire to provide POTS, and find an alternative interface to feed power from the dwelling of a subscriber to the CO (central office) interface of the G.fast DPU/DSLAM equipment to provide G.fast service. For example, the dwelling of the subscriber may have a cable interface as well as the copper interface. Both the copper interface and the cable interface are examples of generic interfaces. But crosstalk occurs between the G.fast system and an existing transmission line (e.g., CATV) on the same generic interface.

Please refer to FIG. 1, which shows an installation scenario 100 for installing CATV and G.fast system on generic interfaces and removing crosstalk. The left side of installation scenario 100 is a distribution point, and the right side is a house. FIG. 1 shows a G.fast DPU/DSLAM equipment 101 which has many ports. Some of the ports of the G.fast DPU/DSLAM equipment 101 (4 ports are shown in FIG. 1) are each connected to an individual unit of G.fast customer premises equipment (CPE) 102. The other side of the G.fast DPU/DSLAM equipment 101 is connected to an optical fiber or an optical line terminal (OLT) 105, and is connected to the Internet 108 through a cloud 120, a video on demand server 107 and an element management system (EMS) server 106 via the optical fiber or an optical line terminal (OLT) 105. Each of the ports of G.fast DPU/DSLAM equipment 101 receives signals from the individual unit of the G.fast CPE 102 that connected to its port. The G.fast DPU/DSLAM equipment 101 detects which generic interface the signals come from and connects the port to the generic interface, e.g., the copper interface or the cable interface. The telecommunications company may select different generic interfaces when providing different types of G.fast services, e.g., Internet access or video on demand. If a TV signal comes from a floor distribution box 104, the TV signal goes to a splitter 109 which integrates CATV, G.fast and power, and which connects to another splitter 110 in the house. The splitter 110 separates CATV from the G.fast CPE 102, and the video signal shows on TV 103. Some ports of the G.fast DPU/DSLAM equipment 101 may be connected to copper interfaces, and very-high-bit-rate digital subscriber lines (VDSLs) may have been installed on the copper interfaces. Crosstalk also occurs between VDSL and G.fast.

In addition, because the G.fast DPU/DSLAM equipment is installed after the installation of an existing transmission line, such as VDSL or CATV, it is mandatory to remove crosstalk interference between G.fast and the existing transmission line when the G.fast DPU/DSLAM equipment is installed. The interference from the existing transmission line causes the transmission speed to be dropped, the packet to be lost, and even worse, the interference causes the G.fast link to go down.

G.fast has two profiles corresponding to bandwidths (maximum frequencies) of 106 MHz and 212 MHz. The frequency for analog CATV is above 54 MHz, and the frequency for digital CATV is above 77 MHz. Therefore, taking G.fast 106 MHz profile as an example, crosstalk may occur between G.fast and analog CATV in the frequency range between 54 MHz and 106 MHz, and between G.fast and digital CATV in the frequency range between 77 MHz and 106 MHz.

VDSL has many profiles, e.g. 8a, 8b, 8c, 8d, 12a, 12b, 17a and 30a, each with its own bandwidth. Among them, 30a has the largest bandwidth (highest maximum frequency) of 30 MHz. The existing VDSL services on a bundle of wires may include one or more of the profiles above. Crosstalk may occur between G.fast and the existing VDSLs having various bandwidths.

Because data is modulated using discrete multitone (DMT) modulation in G.fast, there are 2048 subcarriers (i.e. 2048 tones or frequencies, where each tone or frequency has a sequential index) for the 106 MHz profile and 4096 subcarriers for the 212 MHz profile. The spacing between adjacent subcarriers is 51.75 kHz. ITU Recommendation (ITU-T G9700) requires that the G.fast system should be equipped with a set of tools called a power spectral density (PSD) mask, which can be configured to deal with the problem of crosstalk interference between G.fast and existing transmission lines. For example, some of the G.fast subcarriers can be masked to remove crosstalk. In the case of the copper interface where G.fast and VDSLs are installed on the same bundle of wires, the PSD mask can be configured to set a start frequency in the G.fast system so that the frequency range of the G.fast system lies outside of all the existing VDSLs on the bundle of wires which cause crosstalk, and thus crosstalk is removed automatically.

In prior art, a technician installing the G.fast DPU/DSLAM equipment uses the PSD mask to manually filter out frequencies at which crosstalk occurs between a port of the G.fast DPU/DSLAM equipment and existing transmission lines for each port. For the convenience of the installation technician, the G.fast DPU/DSLAM equipment's manufacturer usually provides the G.fast DPU/DSLAM equipment with the following functions: measuring a type of loop diagnostic metric data related to a communication loop connected between a port of the G.fast DPU/DSLAM equipment and the CPE, e.g., signal-to-noise ratio (SNR), and showing the loop diagnostic metric data to the installation technician, so as to determine the G.fast subcarriers to be masked for that port. Therefore, the installation technician has to be able to read the loop diagnostic metric data, determine the G.fast subcarriers to be masked based on the loop diagnostic metric data, and manually send the correct instructions to mask those G.fast subcarriers using his knowledge of the G.fast system and equipment. However, typical installation technicians do not have these abilities. Experienced technicians with these abilities have to be dispatched, leading to high operation costs. However, even for experienced technicians with these abilities, under the condition that the only crosstalk exists between VDSL and G.fast, the average installation time of a unit of the G.fast DPU/DSLAM equipment is about two days. The lengthy installation time is detrimental to the promotion of G.fast, not to mention that manual operations may introduce misjudgments, e.g., in determining the G.fast subcarriers to be masked, or in sending the instructions to mask those G.fast subcarriers. Therefore, an invention which can greatly speed up the installation time and facilitate the correct installation by typical installation technicians is urgently needed.

A patent application (WO 2015/150732 A1) presented a method and an apparatus for allocating resources in a Digital Subscriber Line (DSL) network on the copper interface, the network includes at least one lower-tier digital subscriber line carrying signals according to a first protocol between a transceiver device at a lower-tier network node and a subscriber transceiver device and further includes at least one higher-tier digital subscriber line carrying signals according to a second protocol between a transceiver device at a higher-tier network node and a subscriber transceiver device, wherein the first protocol permitting signals to be carried at frequencies in a range having a higher upper limit than the second protocol. Thus WO 2015/150732 A1 is applicable to crosstalk between a lower-tier digital subscriber line like G.fast and a higher-tier digital subscriber line like VDSL in the running mode. FIG. 3 of WO 2015/150732 A1 discloses an exemplary process. From FIG. 3 and the related part of the specification of WO 2015/150732 A1, it can be seen that a scan of quiet line noise (QLN) starting from a highest frequency is performed, the most efficient way of performing the scan being sequential from the highest frequency down to the lowest frequency, and a minimum frequency (i.e., start frequency mentioned above) in the lower-tier digital subscriber line is determined by a degradation criterion based on the QLN corresponding to a single specific frequency. The technique is applicable only to the copper interface. Moreover, misjudgement may occur due to the degradation criterion based on the QLN corresponding to a single specific frequency. Furthermore, according to the specification, tones of frequencies above the range that may be used for the longer lines (i.e., the higher-tier digital subscriber lines) may be ignored in choosing the highest frequency. Without adding a guard band to the highest frequency, misjudgement may also occur due to intersymbol interference (ISI).

In order to overcome the drawbacks in the prior art, a method and an apparatus for automatically removing crosstalk is disclosed.

SUMMARY OF THE INVENTION

The present invention discloses a method and an apparatus to automatically remove crosstalk, which can automatically mask G.fast frequencies that will produce crosstalk between existing transmission lines and a port of G.fast DPU/DSLAM equipment for each port without unnecessary manual operation, so as to automatically remove crosstalk interference between G.fast and the existing transmission lines. The present invention allows the installation time of G.fast DPU/DSLAM equipment to be greatly reduced, human errors are also reduced, and the installation can be done correctly by ordinary technicians, which is advantageous to the promotion of G.fast systems. Thus, the present invention has utility for the industry and significant practical applications.

In accordance with one aspect of the present invention, a method for automatically removing a crosstalk between a G.fast system and a transmission line on a generic interface, by means of a processor executing instructions stored in a memory device, wherein the G.fast system has a first G.fast subcarrier corresponding to a minimum G.fast frequency and a second G.fast subcarrier corresponding to a maximum G.fast frequency, and a plurality of G.fast subcarriers exist between the first and the second G.fast subcarriers, is disclosed, and the method includes: measuring a plurality of loop diagnostic metric data related to a communication loop connected between G.fast distribution point unit (DPU)/digital subscriber line access multiplexer (DSLAM) equipment and G.fast customer premises equipment (CPE) by the G.fast DPU/DSLAM equipment; inspecting the plurality of loop diagnostic metric data corresponding to the plurality of G.fast subcarriers between the first and the second G.fast subcarriers; simulating a loop diagnostic metric simulation graph having plural graph points corresponding to the plurality of G.fast subcarriers and related to the communication loop in an absence of the transmission line, wherein a specific one of the plurality of loop diagnostic metric data corresponds to a specific one of the plural graph points, and a specific one of the plural graph points corresponds to a specific one of the plurality of G.fast subcarriers; comparing the specific one loop diagnostic metric data and the specific one graph point corresponding to the specific one G.fast subcarrier to obtain a difference; when the difference complies with a degradation criterion of communication data flow quality, recording the specific one G.fast subcarrier, wherein the degradation criterion of communication data flow quality is established based on a sudden degradation resulting in at least one of a non-sustained link and a packet loss in the specific one G.fast subcarrier; and masking the recorded specific one G.fast subcarrier.

In accordance with a further aspect of the present invention, a method for removing a crosstalk between a first transmission line and a second transmission line by means of a unit of crosstalk-removing access equipment is disclosed, and the method includes: using a plurality of frequency subcarriers to transmit a signal in the first transmission line, wherein the plurality of frequency subcarriers include a first subcarrier end point and a second subcarrier end point, the first transmission line includes the crosstalk-removing access equipment, a customer premises equipment (CPE) and a communication loop connected between the CPE and one of the crosstalk-removing access equipment and a specific access equipment, the communication loop has a plurality of loop diagnostic metric data, and a specific one of the plurality of loop diagnostic metric data corresponds to a specific one of the plurality of frequency subcarriers; inspecting the plurality of loop diagnostic metric data corresponding to the plurality of frequency subcarriers between the first and the second subcarrier end points; using a degradation criterion of communication data flow quality to inspect the specific one loop diagnostic metric data to obtain a result having one of a first and a second values for the specific one frequency subcarrier corresponding to the specific one loop diagnostic metric data from the inspection using the degradation criterion of communication data flow quality; and masking the specific one frequency subcarrier having the result of the first value.

In accordance with another aspect of the present invention, a unit of crosstalk-removing access equipment, wherein the crosstalk-removing access equipment transmits a signal using a plurality of frequency subcarriers, the plurality of frequency subcarriers include a first subcarrier end point and a second subcarrier end point, a communication loop is connected between a customer premises equipment (CPE) and one of the crosstalk-removing access equipment and a specific access equipment, a crosstalk takes place between the communication loop and a transmission line, the communication loop has a plurality of loop diagnostic metric data, and a specific one of the plurality of loop diagnostic metric data corresponds to a specific one of the plurality of frequency subcarriers, is disclosed, and the crosstalk-removing access equipment includes: a first inspecting module inspecting the plurality of loop diagnostic metric data corresponding to the plurality of frequency subcarriers between the first and the second subcarrier end points; and a second inspecting module inspecting the specific one loop diagnostic metric data using a degradation criterion of communication data flow quality to obtain a result having one of a first and a second values for the specific one frequency subcarrier corresponding to the specific one loop diagnostic metric data from the inspection using the degradation criterion of communication data flow quality.

BRIEF DESCRIPTION OF THE DRAWINGS

The details and advantages of the present invention will become more readily apparent to those ordinarily skilled in the art after reviewing the following detailed descriptions and accompanying drawings.

FIGS. 3A and 3B together show the flow chart of an embodiment of the method of the present invention whereby crosstalk is removed automatically.

DETAILED DESCRIPTION OF THE PREFERRED EMBODIMENT

Figure 1:
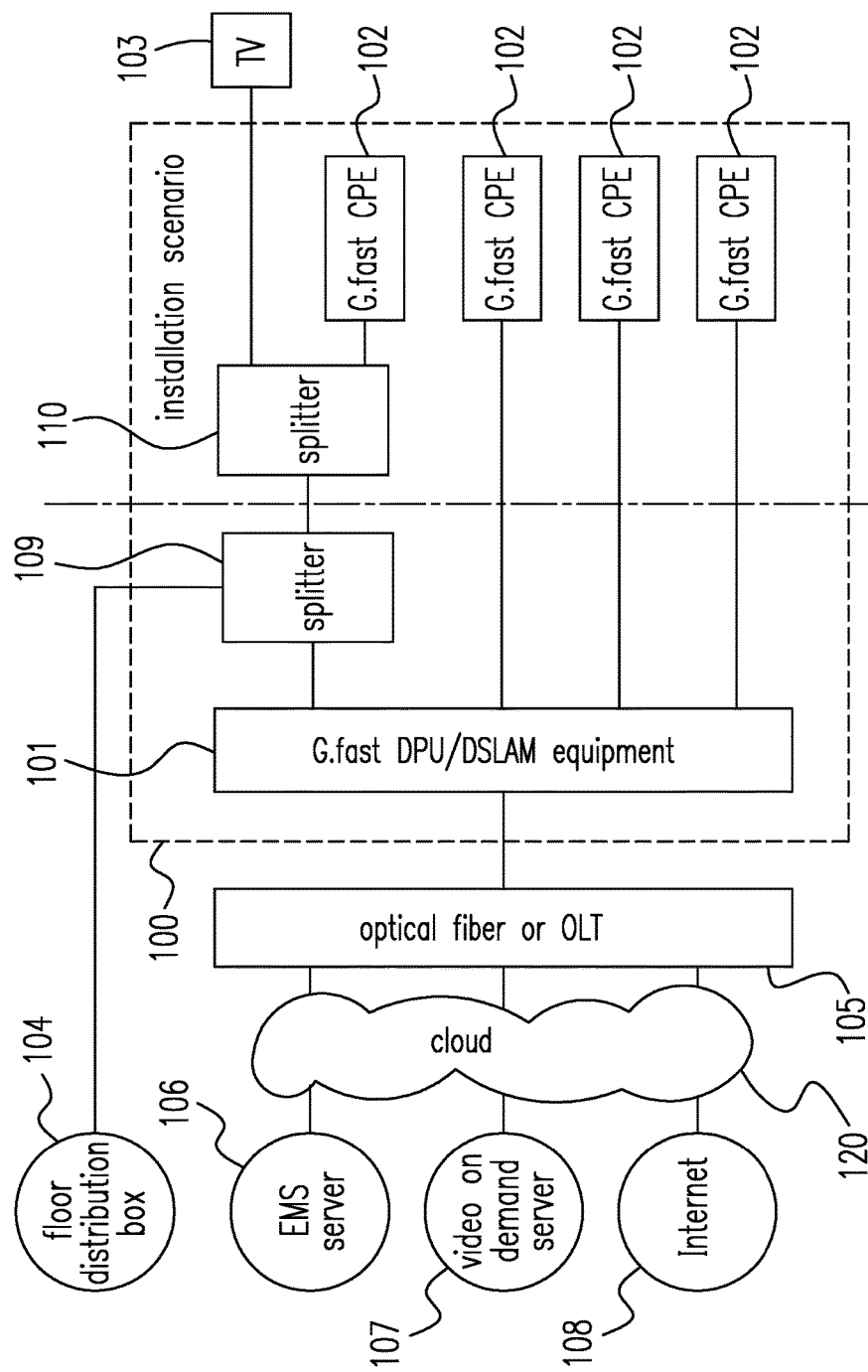
FIG. 1 shows an installation scenario for installing CATV and G.fast system on generic interfaces and removing crosstalk.
Figure 2:
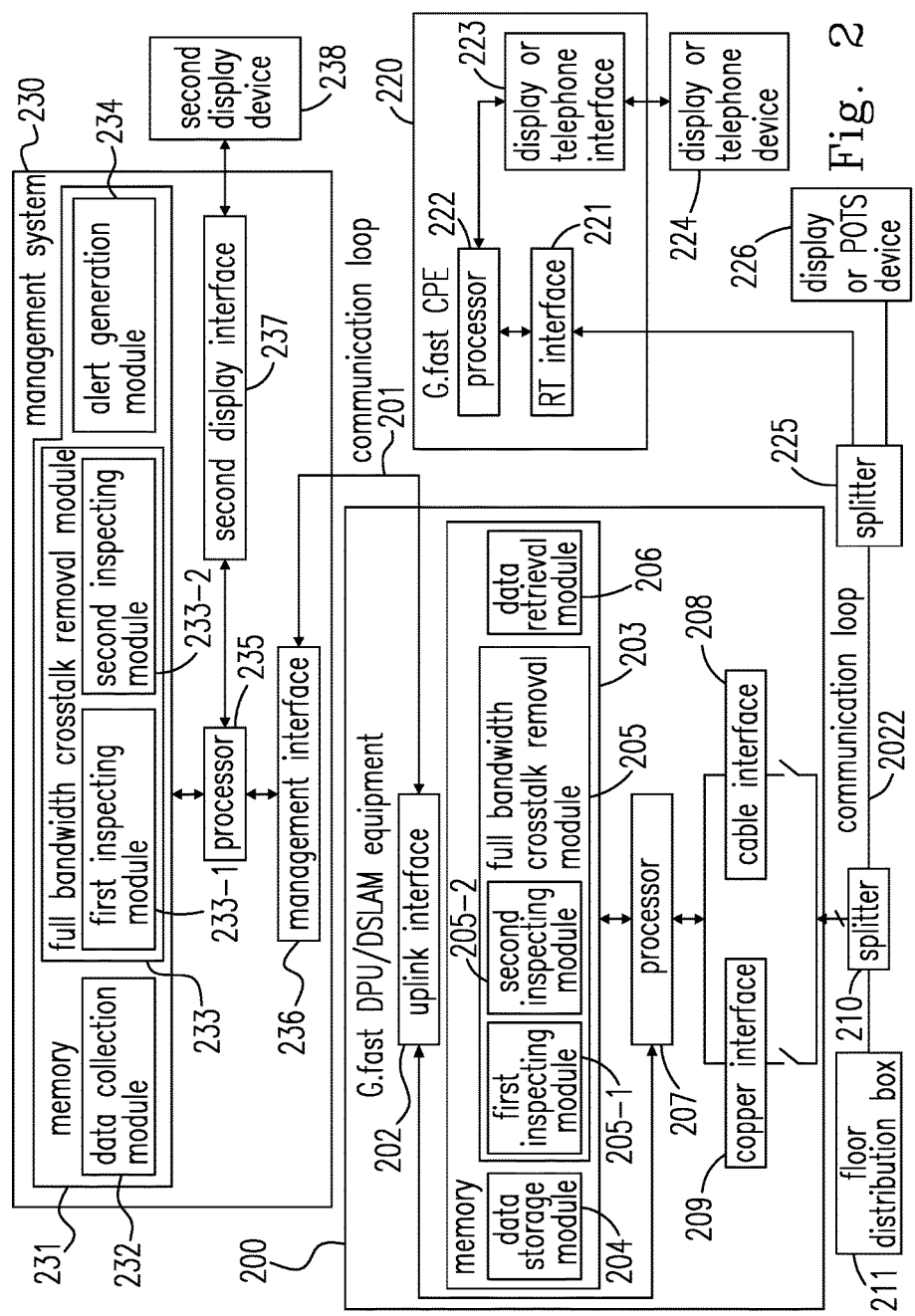
FIG. 2 shows a block diagram of an embodiment of the apparatus of the present invention which removes crosstalk automatically.

Please refer to FIG. 2, which shows the block diagram of an embodiment of the apparatus of the present invention which removes crosstalk automatically. In FIG. 2, G.fast DPU/DSLAM equipment 200 can automatically record the frequencies in the G.fast system to be masked for the communication loop 2022. Through masking the recorded frequencies in the G.fast system, crosstalk produced by another transmission line (e.g., CATV or VDSL) on a generic interface is removed. The communication loop 2022 is connected between a port of G.fast DPU/DSLAM equipment 200 and G.fast CPE 220, and provides a broadband communication path including upstream and downstream channels. The communication loop 2022 may be an access connected to a central office, a dwelling, a basement or a wide area network, or a communication link of any combination above. In FIG. 2, a splitter 210 is configured at the end of the communication loop 2022 and near G.fast DPU/DSLAM equipment 200. The splitter 210 receives signals of CATV or the public switched telephone network (PSTN) from floor distribution box 211, and connects to another splitter 225 at the other end of the communication loop 2022 in the house to separate the signals originated from floor distribution box 211 and send them to a display or POTS device 226. The display or POTS device 226 can be a display or a traditional telephone service device depending on which kind of signals originated from floor distribution box 211. G.fast DPU/DSLAM equipment 200 receives signals from G.fast CPE 220. Since the signals may be sent through different generic interfaces, interface signal data, i.e., data related to which generic interface the signals come from, is first inspected by G.fast DPU/DSLAM equipment 200. When the generic interface is determined based on the interface signal data, the port of G.fast DPU/DSLAM equipment 200 is connected to that generic interface, for example copper interface 209 or cable interface 208 (see related embodiments below). The management system 230 is connected with one or multiple units of G.fast DPU/DSLAM equipment 200, and a unit of G.fast DPU/DSLAM equipment 200 is connected with one or multiple units of G.fast CPE 220. In one embodiment, G.fast CPE 220 is a G.fast digital subscriber line modem or an Integrated Access Device (IAD) with G.fast features. In another embodiment, the broadband communication path carries video and audio data, and G.fast CPE 220 can be a set-top box that provides a broadband connection to transmit the video and audio data to a display or telephone device 224, such as a television, through a display or telephone interface 223. The display or telephone interface 223 can be an internet access interface or a VoIP interface for data access.

In the embodiment shown in FIG. 2, G.fast DPU/DSLAM equipment 200 includes a memory 203 and a mutually connected processor 207. The processor 207 is also connected to a CO interface, which may be one of various generic interfaces, e.g., cable interface 208 or copper interface 209, and an uplink interface 202. The memory 203 stores a full bandwidth crosstalk removal module 205 to automatically remove crosstalk on the communication loop 2022, and stores information related to the automatic removal of crosstalk. In other words, the memory 203 includes instructions executed by the processor 207 to perform a method for masking the G.fast frequencies in the communication loop 2022 at which crosstalk is produced (the method will be described in more detail later). The memory 203 includes a data retrieval module 206, the full bandwidth crosstalk removal module 205 and a data storage module 204. The processor 207 can execute the data retrieval module 206 to process the measurement of loop diagnostic metric data related to the communication loop 2022. The loop diagnostic metric data can be signal-to-noise ratios (SNR), quiet line noise, HLog, other loop performance parameters or a combination thereof. The full bandwidth crosstalk removal module 205 includes a first inspecting module 205-1 and a second inspecting module 205-2. The G.fast system has a first G.fast subcarrier corresponding to a minimum G.fast frequency and a second G.fast subcarrier corresponding to a maximum G.fast frequency, and a plurality of G.fast subcarriers exist between the first and the second G.fast subcarriers (including the first and the second G.fast subcarriers). The processor 207 can execute the first inspecting module 205-1 to inspect the loop diagnostic metric data corresponding to the plurality of G.fast subcarriers between the first and the second G.fast subcarriers, and execute the second inspecting module 205-2 to inspect each of the loop diagnostic metric data using a degradation criterion of communication data flow quality. When a specific one of the loop diagnostic metric data corresponding to a specific G.fast subcarrier meets the degradation criterion of communication data flow quality, the specific G.fast subcarrier is recorded or masked. The degradation criterion of communication data flow quality is established based on a sudden degradation resulting in at least one of a non-sustained link and a packet loss in the specific G.fast subcarrier, and can be adjusted according to the type of loop diagnostic metric data. The processor 207 can also execute the second inspecting module 205-2 to simulate a loop diagnostic metric simulation value having plural graph points corresponding to each plurality of G.fast subcarriers, the transmission line producing crosstalk is absent in the communication loop 2022. The loop diagnostic metric simulation value is driven from the real measurement of the loop conditions. By comparing the specific one of the loop diagnostic metric data and a specific graph point on the loop diagnostic metric simulation value which both correspond to a specific G.fast subcarrier, it may be easier to judge whether the specific one of the loop diagnostic metric data shows that crosstalk has caused a non-sustained link or a packet loss.

The processor 207 executes the full bandwidth crosstalk removal module 205 to mask the G.fast subcarriers at which crosstalk is produced by existing transmission lines for the communication loop 2022. After the G.fast subcarriers are masked and crosstalk is removed automatically, run time noise can be handled with the functions of the G.fast system specified by ITU Recommendation (ITU-T G9701): fast rate adaptation (FRA) and seamless rate adaptation (SRA), wherein a G.fast run time dynamic bit swap is determined by FRA and SRA. The data storage module 204 can be used to store information such as the loop diagnostic metric data, the loop diagnostic metric simulation value, the masked G.fast subcarriers and the G.fast run time dynamic bit swap.

In one embodiment, G.fast DPU/DSLAM equipment 200 may communicate data related to the automatic removal of crosstalk with the management system 230. The memory 203 may include instructions executed by the processor 207 to perform a method to determine what kind of the generic interface is. In one embodiment, G.fast DPU/DSLAM equipment 200 may communicate interface signal data with the management system 230. In another embodiment, the processor 235 can execute the data collection module 232 to send a request for the interface signal data, and the request can be sent to the G.fast DPU/DSLAM equipment 200 via the communication loop 201. The data collection module 232 may also receive the interface signal data from G.fast DPU/DSLAM equipment 200 in response to the request. In another embodiment, the processor 235 can execute the data collection module 232 to send a query to a database in the data collection module 232. The interface signal data related to the G.fast DPU/DSLAM equipment 200 is stored in the database, and the data collection module 232 is utilized to receive the interface signal data from the database in response to the query. In one embodiment, the processor 235 can determine based on the interface signal data that the signals transmitted from the G.fast CPE 220 to the G.fast DPU/DSLAM equipment 200 come from which generic interface. The G.fast CPE 220 includes a remote terminal (RT) interface 221 that facilitates communications between the G.fast CPE 220 and the communication loop 2022. The RT interface 221 may be the cable interface or the copper interface. The G.fast CPE 220 also includes a processor 222 that is coupled to the RT interface 221. The G.fast CPE 220 may include a display or telephone interface 223 which is connected to the processor 222, and the display or telephone interface 223 may connect to the display or telephone device 224. When packet losses are caused by crosstalk, the display or telephone device 224 will show a mosaic.

The management system 230 in FIG. 2 includes a management interface 236 that facilitates communications between the management system 230 and the uplink interface 202 of the G.fast DPU/DSLAM equipment 200 via the communication loop 201. The management system 230 also includes a memory 231 and a mutually connected processor 235. The processor 235 is also coupled to the management interface 236. The memory 231 stores a full bandwidth crosstalk removal module 233 to automatically remove crosstalk on the communication loop 2022, and stores information related to the automatic removal of crosstalk. The memory 231 includes a data collection module 232, the full bandwidth crosstalk removal module 233 and an alert generation module 234. The processor 235 can execute the data collection module 232 to obtain the loop diagnostic metric data related to the G.fast DPU/DSLAM equipment 200. In general, the loop diagnostic metric data can be collected from the G.fast DPU/DSLAM equipment 200, or obtained from the data collection module 232, wherein the data collection module 232 stores the loop diagnostic metric data collected from the G.fast DPU/DSLAM equipment 200. As mentioned before, the data collection module 232 includes a database. In one embodiment, the management system 230 can include multiple servers, and multiple processors 235 may be distributed among the multiple servers, wherein processors 235 operate independently to access data, or operate jointly in any combination thereof to provide processing or compensate for database faults. In another embodiment, the management system 230 can be a single server and the processor 235 is a single processor. In another embodiment, the processor 235 can execute the data collection module 232 to send a request for the loop diagnostic metric data, and the request can be sent to the G.fast DPU/DSLAM equipment 200 via the communication loop 201. The data collection module 232 may also receive the loop diagnostic metric data from G.fast DPU/DSLAM equipment 200 in response to the request. In another embodiment, the processor 235 can execute the data collection module 232 to send a query to the database in the data collection module 232. The database stores the loop diagnostic metric data related to the G.fast DPU/DSLAM equipment 200, and the data collection module 232 is utilized to receive the loop diagnostic metric data from the database in response to the query.

After the loop diagnostic metric data are received, the processor 235 can execute the full bandwidth crosstalk removal module 233 to record which G.fast subcarriers should be masked in the communication loop 2022. The full bandwidth crosstalk removal module 233 includes a first inspecting module 233-1 and a second inspecting module 233-2. The processor 235 can execute the first inspecting module 233-1 to inspect each loop diagnostic metric data corresponding to the plurality of G.fast subcarriers between the first and the second G.fast subcarriers, and execute the second inspecting module 233-2 to inspect each loop diagnostic metric data using the degradation criterion of communication data flow quality. When a specific one of the loop diagnostic metric data of a specific G.fast subcarrier meets the degradation criterion of communication data flow quality, the specific G.fast subcarrier can be recorded or masked. The memory 231 may include instructions executed by the processor 235 to determine what kind of generic interface between the G.fast DPU/DSLAM equipment 200 and the G.fast CPE 220 is. The processor 235 can be connected to a second display interface 237. The second display interface 237 can be connected to a second display device 238. The processor 235 can also execute the alert generation module 234, and send information, such as the generic interface related information, the loop diagnostic metric data, the masked G.fast subcarriers and data related to the G.fast run time dynamic bit swap, through the second display interface 237 to the second display device 238 to report this information to an operator. The embodiment of the second display interface 237 includes a craft interface or a telnet interface. The embodiment of the second display device 238 includes a personal computer or a terminal.

Generally speaking, a full bandwidth crosstalk removal module is located in an access equipment, e.g., DPU/DSLAM equipment or a management system, of a first transmission line, to remove crosstalk between the first transmission line and a second transmission line on a communication loop. The first transmission line can be a G.fast system or other transmission lines with features similar to those of the G.fast system, which uses a plurality of frequency subcarriers to transmit a signal.

Figure 3A:
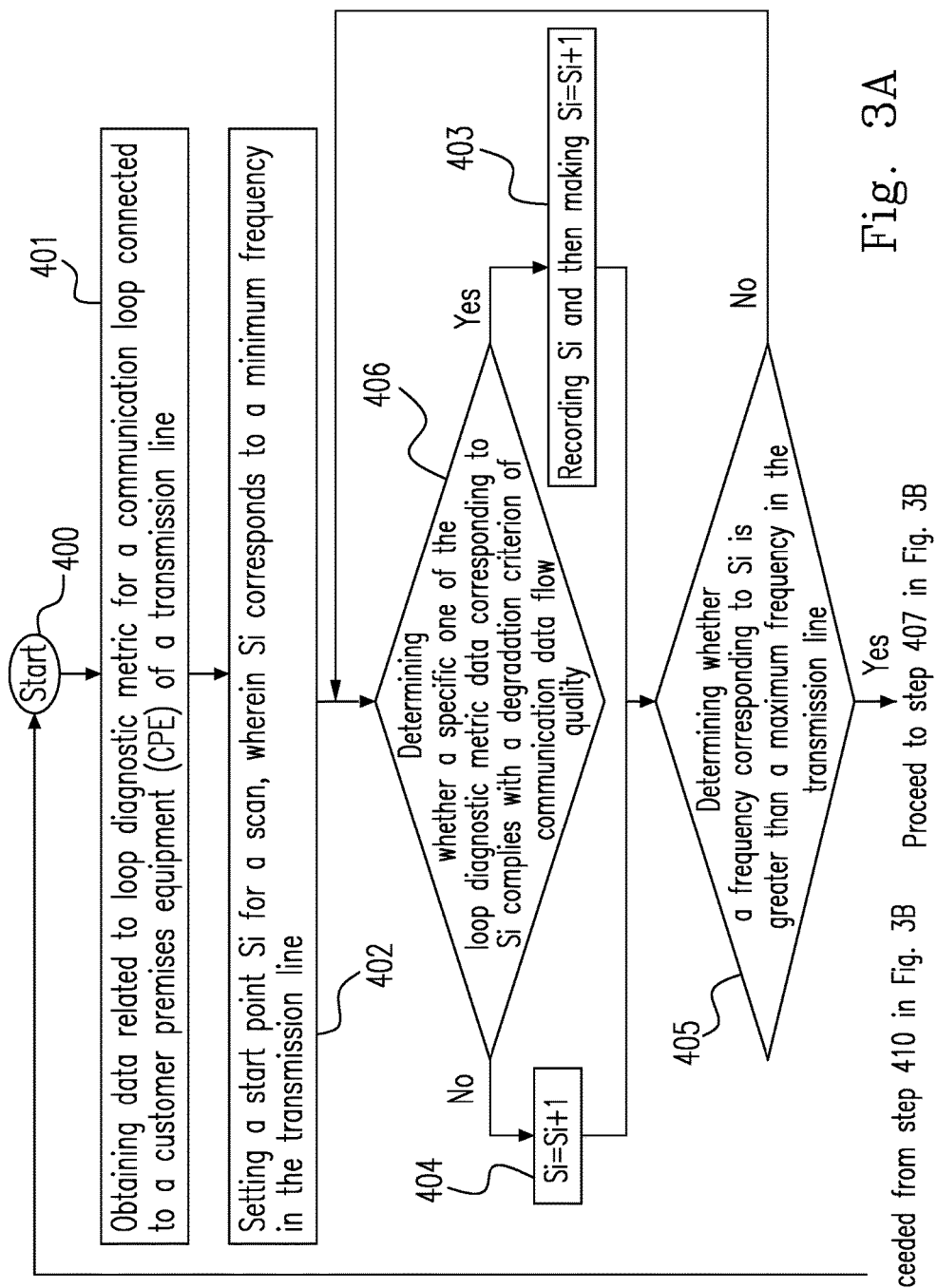

Please refer to FIGS. 3A and 3B, which together show the flow chart of an embodiment of the method of the present invention where crosstalk is removed automatically. The method removes crosstalk between a first and a second transmission lines on a communication loop. The method starts at step 400 in FIG. 3A. In step 401, data related to loop diagnostic metric for a communication loop connected to a CPE of the first transmission line are obtained. The data related to loop diagnostic metric may include loop diagnostic metric data measured by a DPU/DSLAM connected to the communication loop, or a loop diagnostic metric simulation value based on the loop diagnostic metric data related to the communication loop in the absence of the second transmission line. The data related to loop diagnostic metric may be received from the CPE or a memory in a DPU/DSLAM, and be received by a management system. In an embodiment, a processor in a G.fast DPU/DSLAM equipment executes a data retrieval module to measure the loop diagnostic metric data, and executes the second inspecting module in a full bandwidth crosstalk removal module to simulate the loop diagnostic metric simulation value to obtain those data related to loop diagnostic metric. In another embodiment, a processor in the management system executes a data collection module to obtain loop diagnostic metric data related to the G.fast DPU/DSLAM equipment, and executes the second inspecting module in the full bandwidth crosstalk removal module to simulate the loop diagnostic metric simulation value to obtain those data related to loop diagnostic metric. Because a G.fast system uses a time-division duplexing technology, crosstalk produced by other transmission lines has the same impact on the downstream and upstream channels. Therefore, the loop diagnostic metric data and the loop diagnostic metric simulation value only need to correspond to one of the downstream and upstream channels. The data related to loop diagnostic metric is a function of a scan index $S_i$. In step 402, a start point $S_i$ for a scan is set, wherein $S_i$ corresponds to a minimum frequency in the first transmission line. In one embodiment, the first transmission line is a G.fast system, whose minimum frequency is 2.2 MHz and a subcarrier index is 43, and thus, $S_i$ is set as the subcarrier index and the scan starts from $S_i=43$. In one embodiment, the processor in the G.fast DPU/DSLAM equipment executes a first inspecting module in the full bandwidth crosstalk removal module to set the start point for the scan.

In step 406, whether a specific one of the loop diagnostic metric data corresponding to $S_i$ complies with a degradation criterion of communication data flow quality is determined, wherein the degradation criterion of communication data flow quality is established based on sudden degradation resulting in at least one of a non-sustained link and a packet loss. In one embodiment, the determination method includes comparing the loop diagnostic metric datum with the loop diagnostic metric simulation value corresponding to $S_i$ to obtain a difference. The degradation criterion of communication data flow quality provides a first minimum difference. When the difference is greater than or equal to the first minimum difference, at least one of a non-sustained link and a packet loss has happened, and a determination result for step 406 is "yes". In another embodiment, the determination method includes comparing the loop diagnostic metric datum corresponding to the current $S_i$ with the loop diagnostic metric datum corresponding to the preceding $S_i$ (i.e., current $S_i-1$, cf steps 403 and 404) to obtain a difference. The degradation criterion of communication data flow quality provides a second minimum difference. When the difference is greater than or equal to the second minimum difference, at least one of a non-sustained link and a packet loss has happened, and the determination result for step 406 is "yes". The two embodiments may be combined in step 406. The degradation criterion used in the present invention is always based on more than one data point corresponding to a single frequency in the first transmission line to avoid misjudgement. In one embodiment, the processor in the G.fast DPU/DSLAM equipment executes the second inspecting module to determine whether a specific one of the loop diagnostic metric data corresponding to $S_i$ complies with the degradation criterion of communication data flow quality. In another embodiment, the processor in the management system executes the second inspecting module to determine whether a specific one of the loop diagnostic metric data corresponding to $S_i$ complies with the degradation criterion of communication data flow quality. If the determination result for step 406 is "yes", $S_i$ is recorded and then $S_i=S_i+1$ is made (step 403). An embodiment to record $S_i$ is showed as following: in a form which can be called a "mask table", a number "1" is entered into the cell corresponding to the $S_i$, wherein the default value of the cells corresponding to all possible values of $S_i$ is "0." In one embodiment, the processor in the G.fast DPU/DSLAM equipment executes the second inspecting module to record $S_i$ when the specific one of the loop diagnostic metric data corresponding to $S_i$ complies with the degradation criterion of communication data flow quality, and executes the first inspecting module to make $S_i=S_i+1$. In another embodiment, the processor in the management system executes the second inspecting module to record $S_i$ when the specific one of the loop diagnostic metric data corresponding to $S_i$ complies with the degradation criterion of communication data flow quality, and executes the first inspecting module to make Si=Si+1. If the determination result for step 406 is "no", then Si=Si+1 is made (step 404).

Step 403 or step 404 proceeds to step 405. In step 405, whether a frequency corresponding to Si is greater than a maximum frequency in the first transmission line is determined. If the determination result for step 405 is "yes", the step 405 proceeds to step 407. If the determination result for step 405 is "no", the step 405 returns to step 406. In one embodiment, the first transmission line is a G.fast system whose maximum frequency is 106 MHz, and subcarrier index is 2047. When Si>2047, the scan is stopped. The order of the scan can be altered, as long as all the frequencies between the minimum frequency and the maximum frequency (including the minimum and the maximum frequencies) in the first transmission line are scanned. In one embodiment, the processor in the G.fast DPU/DSLAM equipment executes the first inspecting module to perform step 405. In another embodiment, the processor in the management system executes the first inspecting module to perform step 405.

Once the subcarriers that should be masked are recorded, they can be masked without manual operation, and thus crosstalk is removed automatically. Therefore, in step 407, the subcarriers corresponding to the recorded Sis are masked and then the running mode of the first transmission line can be entered, and the related information can be reported to a management system or an operator. The related information includes the communication loop (e.g. a specific port of the DPU/DSLAM equipment), the loop diagnostic metric data, the loop diagnostic metric simulation value and the recorded mask table. In one embodiment, the related information is reported to an operator of an EMS server. The step of masking the subcarriers corresponding to the recorded Si may be performed by the processor in the G.fast DPU/DSLAM equipment or the processor in the management system; the step of reporting the related information may be performed by the G.fast DPU/DSLAM equipment or the management system; and the target of entering the running mode of the first transmission line may be the G.fast DPU/DSLAM equipment or the management system. Therefore, the performance of step 407 may be a combination of the situations above. In step 408, whether a run time noise appears is determined. If the determination result is "yes", the step 408 proceeds to step 409; and if the determination result is "no", step 408 returns to step 408 to continue monitoring run time noise. In step 409, a run time dynamic bit swap of the first transmission line is performed utilizing the functions of the transmission line, e.g., FRA and SRA in the G.fast system, and information of the run time dynamic bit swap is reported to the management system or the operator. In step 410, whether a non-sustained link of the transmission line appears is determined. If the determination results is "yes", step 410 return to step 400 to restart; and if the determination results is "no", the step 410 return to step 408.

Embodiments

1. A method for automatically removing a crosstalk between a G.fast system and a transmission line on a generic interface, by means of a processor executing instructions stored in a memory device, wherein the G.fast system has a first G.fast subcarrier corresponding to a minimum G.fast frequency and a second G.fast subcarrier corresponding to a maximum G.fast frequency, and a plurality of G.fast subcarriers exist between the first and the second G.fast subcarriers, the method comprising:

measuring a plurality of loop diagnostic metric data related to a communication loop connected between a G.fast distribution point unit (DPU)/digital subscriber line access multiplexer (DSLAM) equipment and a G.fast customer premises equipment (CPE) by the G.fast DPU/DSLAM equipment;

inspecting the plurality of loop diagnostic metric data corresponding to the plurality of G.fast subcarriers between the first and the second G.fast subcarriers;

simulating a loop diagnostic metric simulation graph having plural graph points corresponding to the plurality of G.fast subcarriers and related to the communication loop in an absence of the transmission line, wherein a specific one of the plurality of loop diagnostic metric data corresponds to a specific one of the plural graph points, and a specific one of the plural graph points corresponds to a specific one of the plurality of G.fast subcarriers;

comparing the specific one loop diagnostic metric data and the specific one graph point corresponding to the specific one G.fast subcarrier to obtain a difference;

when the difference complies with a degradation criterion of communication data flow quality, recording the specific one G.fast subcarrier, wherein the degradation criterion of communication data flow quality is established based on a sudden degradation resulting in at least one of a non-sustained link and a packet loss in the specific one G.fast subcarrier; and masking the recorded specific one G.fast subcarrier.

2. The method according to Embodiment 1, wherein the plurality of loop diagnostic metric data and the loop diagnostic metric simulation graph correspond to one of a downstream channel and an upstream channel.

3. The method according to Embodiment 1 or 2, wherein each of the plurality of loop diagnostic metric data is one selected from a group consisting of a signal-to-noise ratio, a quiet line noise, an HLog and a combination thereof.

4. The method according to any one of Embodiments 1-3, further comprising: determining a G.fast run time dynamic bit swap by a fast rate adaptation (FRA) and a seamless rate adaptation (SRA) to handle a run time noise.

5. The method according to Embodiment 4, wherein the plurality of loop diagnostic metric data, the recorded specific one G.fast subcarrier and the G.fast run time dynamic bit swap are saved to a data storage module.

6. A method for removing a crosstalk between a first transmission line and a second transmission line by means of a crosstalk-removing access equipment, the method comprising:

using a plurality of frequency subcarriers to transmit a signal in the first transmission line, wherein the plurality of frequency subcarriers include a first subcarrier end point and a second subcarrier end point, the first transmission line includes the crosstalk-removing access equipment, a customer premises equipment (CPE) and a communication loop connected between the CPE and one of the crosstalk-removing access equipment and a specific access equipment, the communication loop has a plurality of loop diagnostic metric data, and a specific one of the plurality of loop diagnostic metric data corresponds to a specific one of the plurality of frequency subcarriers;

inspecting the plurality of loop diagnostic metric data corresponding to the plurality of frequency subcarriers between the first and the second subcarrier end points;

using a degradation criterion of communication data flow quality to inspect the specific one loop diagnostic metric data to obtain a result having one of a first and a second values for the specific one frequency subcarrier corresponding to the specific one loop diagnostic metric data from the inspection using the degradation criterion of communication data flow quality; and
masking the specific one frequency subcarrier having the result of the first value.
7. The method according to Embodiment 6, wherein the degradation criterion of communication data flow quality is established based on a sudden degradation resulting in at least one of a non-sustained link and a packet loss in the specific one frequency subcarrier.
8. The method according to Embodiment 6 or 7, wherein the step of inspecting the plurality of loop diagnostic metric data corresponding to the plurality of frequency subcarriers is performed in a sequential order from the first subcarrier end point to the second subcarrier end point.
9. The method according to any one of Embodiments 6-8, further comprising:
simulating a loop diagnostic metric simulation graph having plural graph points corresponding to the plurality of frequency subcarriers and related to the communication loop in an absence of the second transmission line, wherein a specific one of the plural graph points corresponds to a specific one of the plurality of loop diagnostic metric data; and
comparing the specific one loop diagnostic metric data and the specific one graph point corresponding to the specific one frequency subcarrier.
10. A crosstalk-removing access equipment, wherein the crosstalk-removing access equipment transmits a signal using a plurality of frequency subcarriers, the plurality of frequency subcarriers include a first subcarrier end point and a second subcarrier end point, a communication loop is connected between a customer premises equipment (CPE) and one of the crosstalk-removing access equipment and a specific access equipment, a crosstalk takes place between the communication loop and a transmission line, the communication loop has a plurality of loop diagnostic metric data, and a specific one of the plurality of loop diagnostic metric data corresponds to a specific one of the plurality of frequency subcarriers, comprising:
a first inspecting module inspecting the plurality of loop diagnostic metric data corresponding to the plurality of frequency subcarriers between the first and the second subcarrier end points; and
a second inspecting module inspecting the specific one loop diagnostic metric data using a degradation criterion of communication data flow quality to obtain a result having one of a first and a second values for the specific one frequency subcarrier corresponding to the specific one loop diagnostic metric data from the inspection using the degradation criterion of communication data flow quality.
11. The crosstalk-removing access equipment according to Embodiment 10, wherein the crosstalk-removing access equipment is one of a G.fast distribution point unit (DPU)/digital subscriber line access multiplexer (DSLAM) equipment and a management system.
12. The crosstalk-removing access equipment according to Embodiment 10 or 11, wherein the transmission line is a very-high-bit-rate digital subscriber line (VDSL).
13. The crosstalk-removing access equipment according to any one of Embodiments 10-12, wherein each of the plurality of loop diagnostic metric data is one selected from a group consisting of a signal-to-noise ratio, a quiet line noise, an HLog and a combination thereof.
14. The crosstalk-removing access equipment according to any one of Embodiments 10-13, wherein the first and the second inspecting modules are built in a memory, and a processor executes the first and the second inspecting modules.
15. The crosstalk-removing access equipment according to Embodiment 14, wherein the processor further executes instructions in the memory to mask the specific one frequency subcarrier having the result of the first value.
16. The crosstalk-removing access equipment according to Embodiment 14 or 15, wherein the processor executes the second inspecting module to further perform steps of:
simulating a loop diagnostic metric simulation graph having plural graph points and related to the communication loop in an absence of the transmission line, wherein a specific one of the plural graph points corresponds to a specific one of the plurality of loop diagnostic metric data; and
comparing the specific one loop diagnostic metric data and the specific graph point corresponding to the specific one frequency subcarrier to obtain a difference for determining whether the difference complies with the degradation criterion of communication data flow quality.
17. The crosstalk-removing access equipment according to Embodiment 16, wherein the plurality of loop diagnostic metric data and the loop diagnostic metric simulation graph correspond to one of a downstream channel and an upstream channel.
18. The crosstalk-removing access equipment according to any one of Embodiments 14-17, wherein the processor further performs a step of: determining a run time dynamic bit swap by a fast rate adaptation (FRA) and a seamless rate adaptation (SRA) to handle a run time noise.
19. The crosstalk-removing access equipment according to Embodiment 18, further comprising a data storage module built in the memory, wherein the access equipment is a distribution point unit (DPU)/digital subscriber line access multiplexer (DSLAM) equipment, the processor further executes the second inspecting module to record the specific one frequency subcarrier having the result of the first value, and the plurality of loop diagnostic metric data, the recorded specific one frequency subcarrier and the run time dynamic bit swap are saved to the data storage module.
20. The crosstalk-removing access equipment according to any one of Embodiments 14-19, wherein the processor further executes instructions in the memory to determine a generic interface connected to the CPE.

It can be seen from the above description that the method for automatically removing crosstalk disclosed in the present invention can be implemented by various units of access equipment, can eliminate unnecessary manual operations, and can utilize abilities lacking in human beings to remove crosstalk more reliably. The installation time is greatly reduced, human errors are also reduced, and the installation can be done correctly by ordinary technicians, which are all advantageous to the promotion of G.fast systems. Thus, the present invention has significant practical applications.

It is contemplated that modifications and combinations will readily occur to those skilled in the art, and these modifications and combinations are within the scope of this invention.

What is claimed is:
1. A method for automatically removing a crosstalk between a G.fast system and a transmission line on a generic interface, by means of a processor executing instructions stored in a memory device, wherein the G.fast system has a first G.fast subcarrier corresponding to a minimum G.fast frequency and a second G.fast subcarrier corresponding to a maximum G.fast frequency, and a plurality of G.fast subcarriers exist between the first and the second G.fast subcarriers, the method comprising:

measuring a plurality of loop diagnostic metric data related to a communication loop connected between a G.fast distribution point unit (DPU)/digital subscriber line access multiplexer (DSLAM) equipment and a G.fast customer premises equipment (CPE) by the G.fast DPU/DSLAM equipment;

inspecting the plurality of loop diagnostic metric data corresponding to the plurality of G.fast subcarriers between the first and the second G.fast subcarriers;

simulating a loop diagnostic metric simulation graph having plural graph points corresponding to the plurality of G.fast subcarriers and related to the communication loop in an absence of the transmission line producing the crosstalk, wherein a specific one of the plurality of loop diagnostic metric data corresponds to a specific one of the plural graph points, and a specific one of the plural graph points corresponds to a specific one of the plurality of G.fast subcarriers;

comparing the specific one loop diagnostic metric data and the specific one graph point corresponding to the specific one G.fast subcarrier to obtain a difference;

when the difference complies with a degradation criterion of communication data flow quality, recording the specific one G.fast subcarrier, wherein the degradation criterion of communication data flow quality is established based on a sudden degradation resulting in at least one of a non-sustained link and a packet loss in the specific one G.fast subcarrier; and masking the recorded specific one G.fast subcarrier.

2. The method as claimed in claim 1, wherein the plurality of loop diagnostic metric data and the loop diagnostic metric simulation graph correspond to one of a downstream channel and an upstream channel.

3. The method as claimed in claim 1, wherein each of the plurality of loop diagnostic metric data is one selected from a group consisting of a signal-to-noise ratio, a quiet line noise, an HLog and a combination thereof.

4. The method as claimed in claim 1, further comprising: determining a G.fast run time dynamic bit swap by a fast rate adaptation (FRA) and a seamless rate adaptation (SRA) to handle a run time noise.

5. The method as claimed in claim 4, wherein the plurality of loop diagnostic metric data, the recorded specific one G.fast subcarrier and the G.fast run time dynamic bit swap are saved to a data storage module.

6. A method for removing a crosstalk between a first transmission line and a second transmission line by means of a crosstalk-removing access equipment, the method comprising:

using a plurality of frequency subcarriers to transmit a signal in the first transmission line, wherein the plurality of frequency subcarriers include a first subcarrier end point and a second subcarrier end point, the first transmission line includes the crosstalk-removing access equipment, a customer premises equipment (CPE) and a communication loop connected between the CPE and one of the crosstalk-removing access equipment and a specific access equipment, the communication loop has a plurality of loop diagnostic metric data, and a specific one of the plurality of loop diagnostic metric data corresponds to a specific one of the plurality of frequency subcarriers;

inspecting the plurality of loop diagnostic metric data corresponding to the plurality of frequency subcarriers between the first and the second subcarrier end points;

using a degradation criterion of communication data flow quality to inspect the specific one loop diagnostic metric data to obtain a result having one of a first and a second values for the specific one frequency subcarrier corresponding to the specific one loop diagnostic metric data from the inspection using the degradation criterion of communication data flow quality; and masking the specific one frequency subcarrier having the result of the first value.

7. The method as claimed in claim 6, wherein the degradation criterion of communication data flow quality is established based on a sudden degradation resulting in at least one of a non-sustained link and a packet loss in the specific one frequency subcarrier.

8. The method as claimed in claim 6, wherein the step of inspecting the plurality of loop diagnostic metric data corresponding to the plurality of frequency subcarriers is performed in a sequential order from the first subcarrier end point to the second subcarrier end point.

9. The method as claimed in claim 6, further comprising:

simulating a loop diagnostic metric simulation graph having plural graph points corresponding to the plurality of frequency subcarriers and related to the communication loop in an absence of the second transmission line producing the crosstalk, wherein a specific one of the plural graph points corresponds to a specific one of the plurality of loop diagnostic metric data; and comparing the specific one loop diagnostic metric data and the specific one graph point corresponding to the specific one frequency subcarrier.

10. A crosstalk-removing access equipment, wherein the crosstalk-removing access equipment transmits a signal using a plurality of frequency subcarriers, the plurality of frequency subcarriers include a first subcarrier end point and a second subcarrier end point, a communication loop is connected between a customer premises equipment (CPE) and one of the crosstalk-removing access equipment and a specific access equipment, a crosstalk takes place between the communication loop and a transmission line, the communication loop has a plurality of loop diagnostic metric data, and a specific one of the plurality of loop diagnostic metric data corresponds to a specific one of the plurality of frequency subcarriers, comprising:

a first inspecting module inspecting the plurality of loop diagnostic metric data corresponding to the plurality of frequency subcarriers between the first and the second subcarrier end points; and a second inspecting module inspecting the specific one loop diagnostic metric data using a degradation criterion of communication data flow quality to obtain a result having one of a first and a second values for the specific one frequency subcarrier corresponding to the specific one loop diagnostic metric data from the inspection using the degradation criterion of communication data flow quality, wherein the specific one frequency subcarrier having the result of the first value is masked to remove the crosstalk.

11. The crosstalk-removing access equipment as claimed in claim 10, wherein the crosstalk-removing access equipment is one of a G.fast distribution point unit (DPU)/digital subscriber line access multiplexer (DSLAM) equipment and a management system.

12. The crosstalk-removing access equipment as claimed in claim 10, wherein the transmission line is a very-high-bit-rate digital subscriber line (VDSL).

13. The crosstalk-removing access equipment as claimed in claim 10, wherein each of the plurality of loop diagnostic metric data is one selected from a group consisting of a signal-to-noise ratio, a quiet line noise, an HLog and a combination thereof.

14. The crosstalk-removing access equipment as claimed in claim 10, wherein the first and the second inspecting modules are built in a memory, and a processor executes the first and the second inspecting modules.

15. The crosstalk-removing access equipment as claimed in claim 14, wherein the processor further executes instructions in the memory to mask the specific one frequency subcarrier having the result of the first value.

16. The crosstalk-removing access equipment as claimed in claim 14, wherein the processor executes the second inspecting module to further perform steps of:
    simulating a loop diagnostic metric simulation graph having plural graph points and related to the communication loop in an absence of the transmission line producing the crosstalk, wherein a specific one of the plural graph points corresponds to a specific one of the plurality of loop diagnostic metric data; and
    comparing the specific one loop diagnostic metric data and the specific graph point corresponding to the specific one frequency subcarrier to obtain a difference for determining whether the difference complies with the degradation criterion of communication data flow quality.

17. The crosstalk-removing access equipment as claimed in claim 16, wherein the plurality of loop diagnostic metric data and the loop diagnostic metric simulation graph correspond to one of a downstream channel and an upstream channel.

18. The crosstalk-removing access equipment as claimed in claim 14, wherein the processor further performs a step of: determining a run time dynamic bit swap by a fast rate adaptation (FRA) and a seamless rate adaptation (SRA) to handle a run time noise.

19. The crosstalk-removing access equipment as claimed in claim 18, further comprising a data storage module built in the memory, wherein the access equipment is a distribution point unit (DPU)/digital subscriber line access multiplexer (DSLAM) equipment, the processor further executes the second inspecting module to record the specific one frequency subcarrier having the result of the first value, and the plurality of loop diagnostic metric data, the recorded specific one frequency subcarrier and the run time dynamic bit swap are saved to the data storage module.

20. The crosstalk-removing access equipment as claimed in claim 14, wherein the processor further executes instructions in the memory to determine a generic interface connected to the CPE.

* * * * *